April 22, 1924.
M. W. SPENCER
1,491,320
COMBINED CLIPPER, COMB, AND SHEARS
Filed Sept. 13, 1923  2 Sheets-Sheet 1
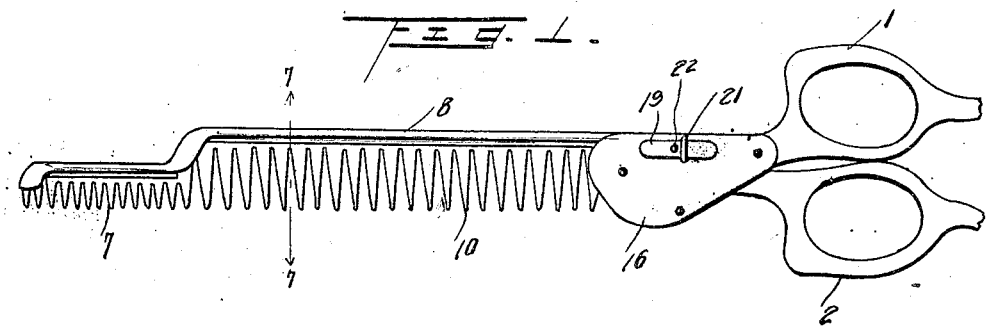
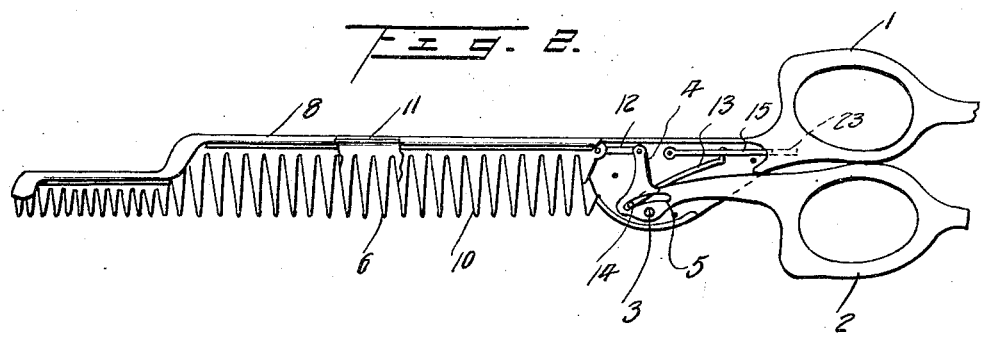
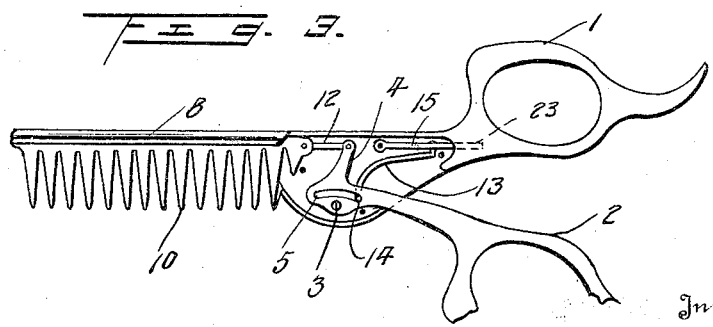
Inventor
M. W. Spencer
By A. Randolph Jr.
Attorney April 22, 1924.
M. W. SPENCER
1,491,320
COMBINED CLIPPER, COMB, AND SHEARS
Filed Sept. 13. 1923   2 Sheets-Sheet 2
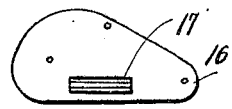
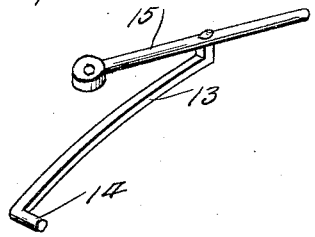
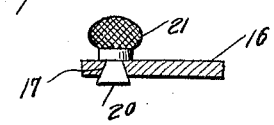
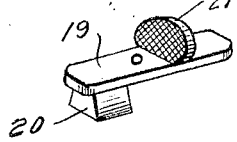
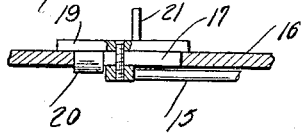
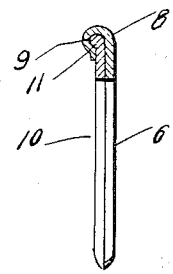
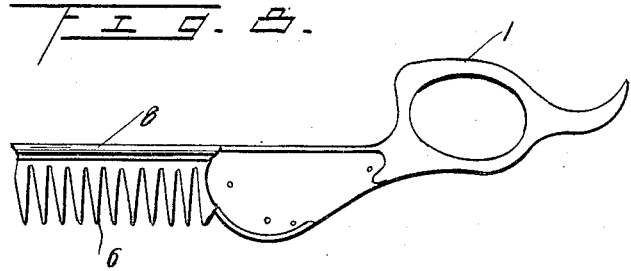
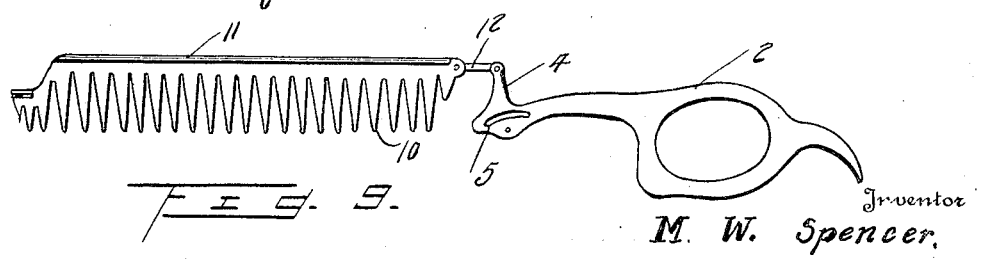
Inventor
M. W. Spencer,
By
Attorney Patented Apr. 22, 1924.

1,491,320

UNITED STATES PATENT OFFICE.

MARK W. SPENCER, OF MEMPHIS, TENNESSEE.

COMBINED CLIPPER, COMB, AND SHEARS.

Application filed September 13, 1923. Serial No. 662,542.

*To all whom it may concern:*

Be it known that I, MARK W. SPENCER, a citizen of the United States, residing at Memphis, in the county of Shelby and State of Tennessee, have invented certain new and useful Improvements in Combined Clippers, Combs, and Shears; and I do hereby declare the following to be a full, clear, and exact description of the invention, such as will enable others skilled in the art to which it appertains to make and use the same.

The primary object of the present invention is the provision of an implement which may be used either as a clipper, a comb or shears, and which embodies a shifting mechanism whereby to normally hold the handles either in closed or open position as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is an elevational view of an implement of the character stated embodying the invention, Figure 2 is a view similar to Figure 1, the cap plate being omitted and parts of the toothed members broken away, Figure 3 is a detail view showing the handle operating spring shifted and the handles open or spread, Figure 4 is a detail view of the cap plate as seen from the inner side, Figure 5 is a detail perspective view of the spring and attached shifting bar, Figure 6 is a detail perspective view of the slide for operating the shifting bar, Figure 7 is an enlarged section on the line 7—7 of Figure 1, Figure 8 is a detail view of one of the handle members and a portion of the toothed member, Figure 9 is a detail view of the companion handle member, Figure 10 is a detailed sectional view showing the slide positioned on the top plate and having connection with the bar, and Figure 11 is a detail view showing the cap plate in section and showing the slide in place.

Corresponding and like parts are referred to in the following description and designated in the several views of the drawings by like reference characters.

The handle members are designated respectively by the numerals 1 and 2 and are pivotally connected at 3 and in form approximate corresponding parts of shears or scissors. The member 2 has a lateral extension 4 and is provided with a curved slot 5. The handle member 1 is formed with a toothed member 6, the outer portion of which is reduced in width, as indicated at 7, the points of the teeth terminating in a straight line. The back of the toothed member 6 is formed with a lateral enlargement 8 having a groove or opening 9. A companion toothed member 10 is placed against the toothed member 6 and cooperates therewith in substantially the same manner as the cutting members of a hair clipper. The back of the toothed member 10 is provided with a laterally disposed rib or flange 11 which snugly fits the groove or opening 9 of the member 6, whereby to hold the two members in predetermined position and direct them in their relative reciprocating movement. The member 10 coincides in outline with the member and the teeth of each constitute cutting elements as well as elements of a comb.

A link 12 connects the inner end of the member 10 with the outer end of the extension 4 and when the handles 1 and 2 are oscillated, the members 6 and 10 are reciprocated and their teeth coact as cutting elements to cut the hair. A flat spring 13 has a projection 14 which enters the curved slot 5 of the member 2 and operates to normally hold said member either in open or closed position according to the adjusted position of the spring. A shifting bar 15 has the spring 13 attached thereto and the position of the bar 15 determines the position of the spring 13. A cap plate 16 is attached to the handle member 1 and covers the spring 13, shifting bar 15, link 12, and pivot end of the handle member 2. A longitudinal slot is formed in the cap plate 16, the walls of the slot being flared as shown at 17. A slide 19 normally closes the slot and is placed against the outer side of the plate 16. The slide 19 is formed with a wedge-shaped projection 20 and a fingerpiece 21, the projection 20 passing through the enlarged portion 17 of the slot and engaging the constricted portion 18. The slide 19 is connected to the shifting bar 15 by means of a screw 22. The free end of the shifting bar 15 operates in an opening 23 formed in the handle member 1, thereby directing the same in its movement. When the slide 19 and bar 15 are moved forwardly, the spring 13 operates to hold the handle members in closed position, as shown most clearly in Figure 2, but when the slide and bar 15 are moved rearwardly, the spring 13 operates to hold the handle members spread or in open position, as indicated most clearly in Figure 3. In either position of the spring, the latter operates to hold the toothed members 6 and 10 in a given position. The toothed members 6 and 10 are operated by moving the handle members 1 and 2 in one direction by manipulating the hand in substantially the same manner as the blades of shears or scissors, said handle members being moved in the opposite direction by means of the spring 13, as will be readily appreciated. In either position of the handle members, the teeth of the members 6 and 10 register so that the device may be used as a comb.

What is claimed is:

1. In an implement of the character specified, a handle member provided with a toothed member, a complemental toothed member slidably mounted upon the first mentioned toothed member, a handle member pivoted to the first mentioned handle member and having connection with the slidable toothed member, a spring in cooperative relation with the pivoted handle member, and shifting means for adjusting said spring to normally hold the handle members closed or open.

2. An implement of the character specified, comprising pivoted handle members, coacting toothed members in cooperative relation with the handle members, a spring engaging the movable handle member, and means mounted upon the other handle member and having said spring attached thereto, said means being adjustable to change the position of the spring whereby to hold the handle members either in open or closed position.

3. In an implement of the character specified, a handle member provided with a toothed member, a pivoted handle member, a slidable toothed member mounted upon the first mentioned toothed member and having connection with the pivoted handle member to be operated thereby, a spring in engagement at one end with the pivoted handle member, and a shifting bar mounted upon the first mentioned handle member and having said spring attached thereto and adjustable therewith, whereby to hold the handle members either in open or closed position.

4. In an implement of the character specified, a fixed handle member provided with a toothed member, a second handle member pivoted to the fixed handle member, a toothed member slidably mounted upon the first mentioned toothed member and having connection with the pivoted handle member to be operated thereby, a spring having engagement at one end with the pivoted handle member, and a shifting bar mounted upon the fixed handle member and having said spring attached thereto and movable therewith whereby to hold the handle members either in open or closed position as required.

5. An implement of the character specified comprising a fixed handle member provided with a toothed member, a complemental toothed member slidably mounted upon the first mentioned toothed member, a second handle member pivoted to the fixed handle member and having connection with the slidable toothed member and formed with a slot, a shifting bar on the fixed handle member and having the said spring attached thereto and adjustable therewith.

6. An implement of the character specified comprising a fixed handle member provided with a toothed member, a complemental toothed member slidably mounted upon the first mentioned toothed member, a second handle member pivoted to the fixed handle member and having connection with the slidable toothed member and formed with a slot, a shifting bar on the fixed handle member and having the said spring attached thereto and adjustable therewith, a plate covering the operating parts, and a slide mounted upon the plate and having connection with the said shifting bar to admit of adjustment thereof.

7. An implement of the character specified comprising a fixed handle member provided with a toothed member, a complemental toothed member slidably mounted upon the first mentioned toothed member, a second handle member pivoted to the fixed handle member and having connection with the slidable toothed member and formed with a slot, a shifting bar on the fixed handle member and having the said spring attached thereto and adjustable therewith, a plate covering the working parts and having a slot enlarged at one end and constricted at the opposite end, a slide mounted upon the plate and having a projection operating in the slot thereof, and connecting means between the slide and shifting bar.

8. An implement of the character specified comprising a fixed handle member having a toothed member, a complemental toothed member slidably mounted upon the first mentioned toothed member, a second handle member pivoted to the fixed handle member and having a lateral extension and a curved slot, a link connection between the slidable toothed member and the extension of the pivoted handle member, a spring having one end engaging the slot of the pivoted handle member, a shifting bar on the fixed handle member and having said spring attached thereto, a cap plate covering the operating parts and secured to the fixed handle member and provided with a slot having an enlarged portion and a constricted portion, a slide exterior to the cap plate and covering the slot thereof and provided with a fingerpiece and a projection, the latter operating in the slot of the cap plate, and connecting means between said slide and the shifting bar.

In testimony whereof I affix my signature in presence of two witnesses.

MARK W. SPENCER.

Witnesses:
 E. S. BROOKS,
 V. M. COLLIER.